Sept. 22, 1970  C. KLEESATTEL ETAL  3,529,465
FATIGUE TESTING AND APPARATUS THEREFOR
Filed Feb. 23, 1968  2 Sheets-Sheet 1

INVENTORS
CLAUS KLEESATTEL
WOLFGANG EISENMENGER
BY
ATTORNEY

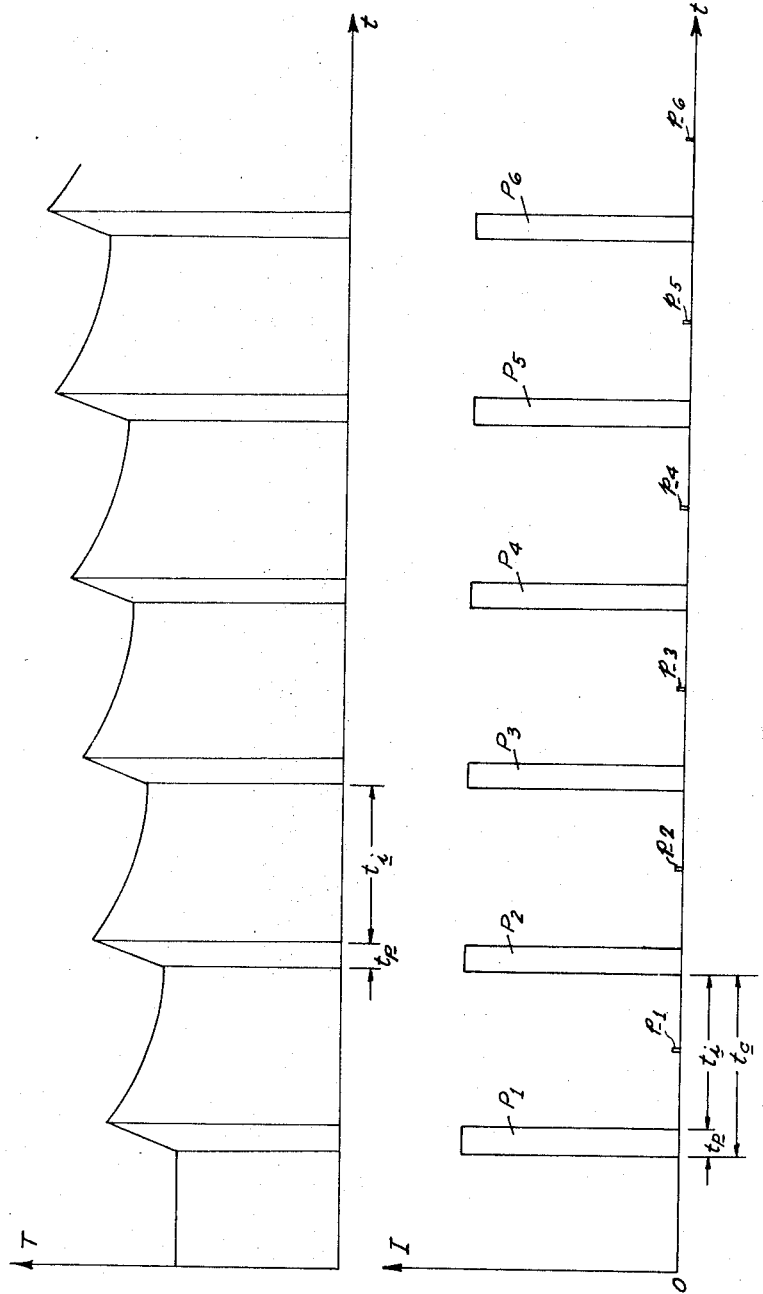
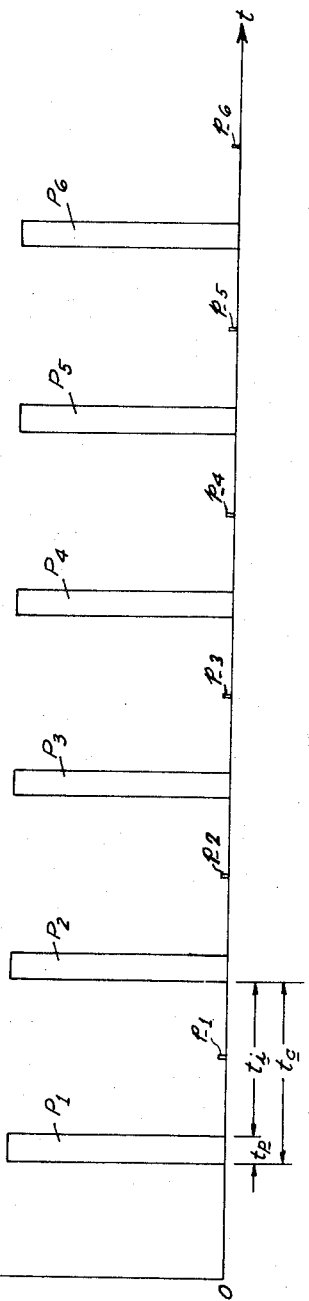
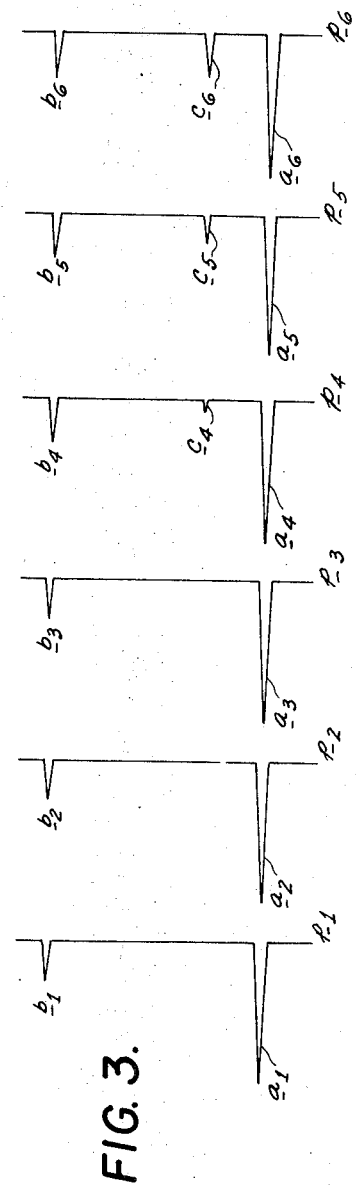
FIG. 4.
FIG. 2.
FIG. 3.
INVENTORS
CLAUS KLEESATTEL
WOLFGANG EISENMENGER
BY
ATTORNEY United States Patent Office 3,529,465
Patented Sept. 22, 1970

3,529,465
FATIGUE TESTING AND APPARATUS THEREFOR
Claus Kleesattel, 9841 64th Road, Forest Hills, N.Y. 11374, and Wolfgang Eisenmenger, In der Bleiche 30, Gottingen, Germany
Filed Feb. 23, 1968, Ser. No. 707,538
Int. Cl. G01n 29/00
U.S. Cl. 73—67.3      20 Claims

ABSTRACT OF THE DISCLOSURE

A specimen has a surface acoustically coupled to the small end of a solid, frusto-conical wave guide, and high energy or power pulses of high ultrasonic frequency are intermittently generated by transducer elements on a convexly shaped large end of the wave guide to focus the generated waves at a focal point or zone within the specimen whereby to subject the specimen to a large number of high intensity stress cycles at the focal zone during each power pulse for eventually inducing fatigue damage or failure at such zone, with such fatigue damage or failure at the focal zone being detected, either by the pulse-echo method or other similar measures during the intervals between power pulses, or by sensing the relatively low frequency emissions or noises characteristic of the fatigue damage or failure.

---

This invention relates generally to fatigue testing.

It has been recognized, for example, as in "High Frequency Fatigue of Metals and Their Cavitation Damage Resistance," by A. Thiruvengadam, Transactions of the ASME, August 1966, page 332, that a correlation exists between the usual low-frequency fatigue testing results and those obtained with relatively high frequencies, such as frequencies of about 14 kc./s. However, in such experimental work, the high frequency fatigue tests were performed only on resonant specimens. That is, a high frequency or ultrasonic resonator was machined from the material under test and such resonator was secured to an ultrasonic transducer tuned to resonance, thereby to effect ultrasonic vibration of the specimen at its resonant frequency. Since the strained volume in a resonant specimen is substantial, a substantial amount of thermal energy is generated in the specimen. Adequate cooling of the specimen is either impossible or, at best, difficult to achieve so that an undesirable temperature rise occurs in the specimen at high ultrasonic strain rates. Further, the described procedure, in requiring the machining of special resonant specimens, does not permit the ultrasonic fatigue testing of actual structural parts or assemblies. Another disadvantage of the described procedure is that the locations of the maximum stresses generated in the specimen, when vibrated at ultrasonic frequencies, cannot be predetermined at will, but rather depend on the geometry of the specimen.

In the copending application for U.S. Letters Patent, Ser. No. 654,488, filed July 19, 1967, by Claus Kleesattel, it is disclosed to initially indent the surface of a specimen, which may be an actual structural part or assembly, by a contact tip on a mechanical resonating member. The contact tip is shaped to afford an area of contact with the specimen surface which increases with increasing penetration or indentation. Following such initial indentation of the specimen surface, and while holding the tip in steady contact with the intended specimen surface by a suitable static force, the mechanical resonating member is vibrated at a resonant frequency thereof which is preferably in the ultrasonic range to cyclically stress the specimen at or near its surface engaged by the tip until, by reason of fatigue, the stressed region of the specimen yields further under the applied static force to increase the indentation and hence the area of contact of the tip with the specimen. The resonant frequency of the mechanical resonating member shifts in response to such increase in the area of contact of its tip with the specimen and thereby indicates the yielding by reason of fatigue. The resonant frequency of the mechanical resonating member can be monitored as a function of time to indicate the number of stress cycles required to produce the further yielding by fatigue, as represented by a shift of the resonant frequency, whereby the specimen's resistance to fatigue damage or failure can be determined without substantial destruction of the specimen. The foregoing procedure is capable of rapidly testing actual structural parts or assemblies for fatigue damage or failure without undesirable temperature increases in the tested parts. Such testing is limited to determining the fatigue characteristics at or near the surface of the test piece or specimen, and thus is influenced by the hardness or other surface properties, and further the fatigue test is preceded by plastic deformation at the surface. However, in some instances, it is desirable to test for fatigue damage or failure at a location deep within the test piece or specimen so that the results of the test will be independent of the specimen's surface characteristics. Further, it may be required to test for fatigue damage or failure either within a specimen or close to a surface thereof without prior plastic deformation of the specimen at such surface.

Accordingly, it is an object of this invention to effect fatigue testing of a specimen at any desired depth from an accessible surface thereof without causing an initial plastic deformation at such surface and without producing an undesirable temperature rise of the specimen.

Another object is to make possible the aforementioned fatigue testing of actual parts or assemblies thereof rather than the testing of specially machined resonant specimens.

In accordance with this invention, the specimen which may be an actual part or assembly, has a surface thereof acoustically coupled, either directly, as by welding or through a liquid or solid bonding film, to the relatively small end surface of a solid frusto-conical wave guide, and intermittent high energy or power pulses of high ultrasonic frequency, such as 5 to 10 mc./s., are generated by transducer elements on the large end or input surface of the wave guide which is spherical, parabolic or otherwise convexly shaped to focus the generated waves at a focal point within the specimen which is the desired distance from the surface to which the wave guide is coupled. During each power pulse, the focal zone within the specimen is subjected to a large number of stress cycles at an intensity that is many times, for example, of the order of 2500 times, the intensity at the input surface of the wave guide by reason of the focusing action of the latter. During the intervals between the power pulses, or simultaneously therewith, any fatigue damage or failure previously incurred at the focal zone is suitably detected.

The occurence of fatigue damage or textural changes in the specimen can be detected during the intervals between power pulses by the pulse-echo method, that is, by emitting low-power probing pulses from the transducer elements for focusing by the wave guide at the focal zone of possible damage and using such transducers as a pick-up to also detect the waves reflected from that zone when the onset of fatique produces inhomogeneity therein; by emitting low-power probing pulses from the transducer elements through the wave guide and employing separate pick-up transducers to detect the sound waves or pulses which are scattered, diffracted or refracted at the focal zone by fatigue damage therein; by emitting low-power probing pulses from the transducer elements through the wave guide and employing a separate pick-up transducer at a surface opposed to that bonded to the wave guide to detect a variation in the phase difference between the emitted wave and the wave transmitted to the pick-up transducer or a variation in the intensity of the transmitted wave as an indication of fatigue damage; or by detecting the sonic or ultrasonic emissions occurring during micro-pore or slip line formation or the noises of lower frequency generated by friction between sliding crack boundaries that are characteristic of the textural changes preceding serious fatigue damage and of actual fatigue damage, respectively, which latter detection can also be effected simultaneously with the power pulses by reason of the large difference between the frequency of such power pulses and the frequency of the emissions or noises that are generated.

The above, and other objects, features and advantages of this invention, will be apparent in the following detailed description of illustrative embodiments thereof which is to be read in connection with the accompanying drawings, wherein:

FIG. 2 is a graphic representation of the power pulses and probing pulses generated by the apparatus of FIG. 1 for respectively inducing fatigue damage within the specimen and detecting such damage;

FIG. 3 is a graphic representation of the indications provided on the screen of an oscilloscope in response to successive probing pulses by the apparatus of FIG. 1;

FIG. 4 is a graphic representation of the temperature changes in a specimen during the testing thereof according to this invention;

Figure 1:
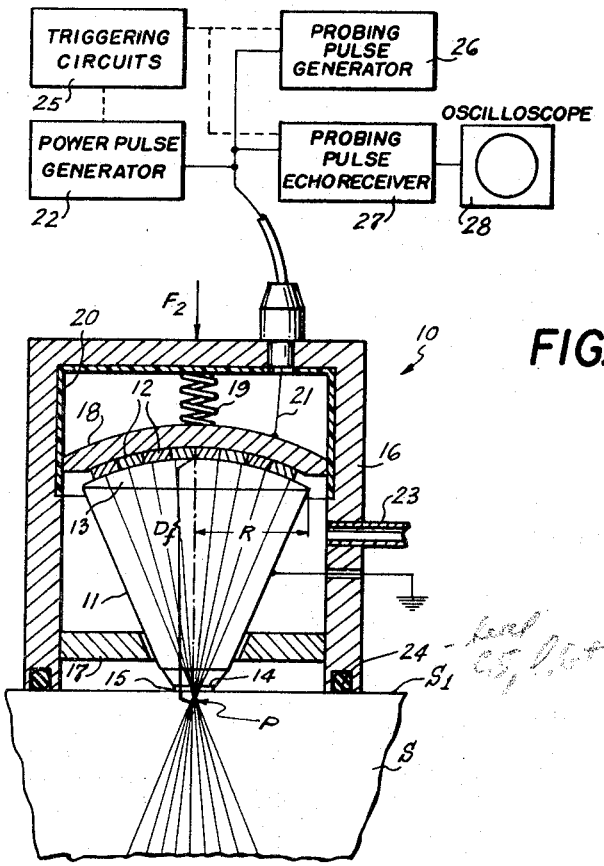
FIG. 1 is a schematic, sectional view illustrating an apparatus for fatigue testing of a specimen in accordance with an embodiment of this invention.

Referring to the drawings in detail, and initially to FIG. 1 thereof, it will be seen that an apparatus 10 for fatigue testing of a specimen S in accordance with this invention may comprise a substantially frusto-conical, solid wave guide 11 of a suitable metal, such as, aluminum, steel or the like, through which ultrasonic energy of high frequency may be efficiently transmitted. In order to minimize reflection at the interface between wave guide 11 and specimen S, the acoustic impedance of the wave guide should not differ too much from that of the specimen or test piece. The ultrasonic energy of high frequency, for example, in the range from 5 to 10 mc./s. is generated by transducer elements 12 of quartz, barium titanate or the like arranged in a mosaic on the convex large end surface 13 of wave guide 11. The convex large end surface 13 may be spherical, parabolic or the like so as to provide a focal point P at a distance beyond the small end surface 14 which corresponds to the depth within specimen S at which resistance to fatigue damage or failure is to be tested.

The small end surface 13 is shaped to correspond to the configuration of the surface $S_1$ on specimen S to which the wave guide 11 is to be coupled. In order to make possible the transmission of ultrasonic energy between wave guide 11 and specimen S with a minimum of losses, the apparatus 10 of FIG. 1 employs a liquid coupling film 15 between end surface 14 and specimen surface $S_1$. The liquid employed for coupling film 15 should have a high viscosity combined with low compressibility, that is, a high mechanical impedance, and it has been found that acetylene tetrabromide and methylene iodide are suitable for this purpose. The film 15 should be as thin is possible to keep absorption losses therein to a minimum. In any case, the thickness of film 15 should be a fraction of a wavelength of the sound waves to be transmitted therethrough from wave guide 11 to specimen S. Thus, if the sound velocity in the film is 1000 m./sec. and the frequency of the transmitted sound wave is 10 mc./s., the thickness of the film should not exceed 25 microns.

As shown, wave guide 11 may be disposed within a housing 16 which opens downwardly so that small end 14 of the wave guide can extend therefrom for coupling engagement with surface $S_1$ of the specimen when housing 16 is pressed against specimen S, as by a static force $F_2$. A centering plate 17 may extend across the lower portion of housing 16 to center and retain wave guide 11 therein when housing 16 is removed from the specimen. The transducer elements 12 may be backed-up by a backing plate 18 having parallel opposed surfaces which conform to the curvature at the large end surface 13 of the wave guide. The thickness of backing plate 18 is preferably a whole multiple of the half-wavelength of the soundwave therein to provide an acoustically soft or low-impedance termination. A spring 19 is shown interposed between the top of housing 16 and backing plate 18 and thus serves to force the sub-assembly of backing plate 18, transducer elements 12 and wave guide 11, which may be suitably bonded to each other, downwardly relative to housing 16, thereby to press end 14 of the wave guide against the specimen when housing 16 is held in contact with the specimen by force F. The backing plate 18 may slidably engage, at its periphery, an insulating lining 20, provided in the upper portion of housing 16, thereby to center wave guide 11 at the top or large end thereof.

The transducer elements 12 are connected through backing plate 18 to a conductor 21 by which electrical, power pulses of high ultrasonic frequency and high power are received from a conventional power pulse generator 22 whereby to energize elements 12. By reason of the arrangement of transducer elements 12 on the convex surface of wave guide 11 and the resulting focusing effect of the latter, the intensity of the waves at the focal point P far exceeds the intensity thereof at the surface 13 where the sound waves are introduced into the focusing wave guide. The intensity gain by focusing due to the wave guide 11, summing that the surface 13 is part-spherical, is given by the formula:

$$\frac{I_f}{I_o} = \left(\frac{\pi R^2}{\lambda D_f}\right)^2$$

in which $I_o$ is the intensity at the surface 13; $I_f$ is the intensity at the focal point P; $\lambda$ is the wavelength; $D_f$ is the focal distance; and R is the radius from the central axis of wave guide 11 to the periphery of surface 13. It will be apparent from the foregoing that very substantial intensity gains can be achieved by the focusing effect of wave guide 11. For example, if $R=2.5$ cm., $D_f=6.5$ cm. and $\lambda=0.06$ cm., which values are readily achieved, the intensity gain $(I_f/I_o)$ becomes 2500. With such a high intensiay gain, it is feasible to produce cyclic stressing of the specimen S at a focal point within the latter at a level to produce fatigue therein. For example, in steel, the stress levels to produce fatigue are of the order of magnitude of 40,000 p.s.i. ($2.8 \times 10^9$ dynes/cm.$^2$) and the corresponding sound intensity is approximately 100,000 watts/cm.$^2$. Assuming that the intensity gain is 2500, as above, the required $I_f$ of 100,000 watts/cm.$^2$ at the focal point P within a steel specimen can be achieved with an initial intensity of $I_o$ of 40 watts/cm.$^2$. With the radius R having a value of 2.5 cm., the surface 13 has an area of 20.4 cm.$^2$, and hence the required power is 816 watts which is well within the capacity of existing generators.

Although the position of focal point P depends on the dimensions and geometry of focusing wave guide 11, it also is affected by the ratio $V_{L_1} = V_{L_2}$ of the sound velocities in the wave guide 11 and in the test piece or specimen S, respectively. If $V_{L_1} = V_{L_2}$ is considered as a reference situation, it is found that the focal point P is moved relatively closer to the specimen surface $S_1$ when $V_{L_2} > V_{L_1}$, and conversely that the focal point P is moved further from surface $S_1$ when $V_{L_2} < V_{L_1}$.

Since the sound intensity or pressure is already very high in the region of the interface between wave guide 11 and specimen S, it is necessary to pressurize the liquid coupling film 15 to suppress cavitation therein. As shown, pressurization of film 15 may be conveniently effected by supplying compressed air to the interior of housing 16, as through an inlet 23, and sealing the bottom of housing 16 against specimen surface $S_1$, as by a sealing ring 24 of rubber or the like in a groove at the bottom of the housing.

An important advantage of this invention resides in the fact that stressing to a level for inducing fatigue changes or damage in the specimen S at the focal point P can be effected in a relatively short time without substantial increases in the temperature of the specimen. For example, the power pulse generator 22 may be triggered by conventional triggering circuits 25 so that each power pulse has a duration of 0.01 second and there is one power pulse per second, that is, the successive power pulses are separated by 0.99 second. If the frequency of each power pulse is 10 mc./s., then there will be 100,000 stress cycles in the 0.01 duration of each power pulse and hence 100,000 stress cycles per second. Although the sound energy is dissipated and scattered throughout the specimen S once it has passed through the region of focal point P, there is measurable absorption in the focal point leading to a temperature rise during each power pulse, which temperature rise is at a maximum near the focal point and relatively smaller for the rest of the specimen. However, between successive power pulses there is an interval of a duration 99 times that of the power pulse so that, after each power pulse, there is cooling caused by conduction away from the focal zone. FIG. 4 is a plot showing the temperature T at the focal zone of the specimen as a function of time $t$. It will be seen therefrom that, during each power pulse of the duration of time $t_p$, there is an increase in temperature followed by a cooling for the time $t_i$ of the interval until the next power pulse. Thus, even after a number of power pulses required for obtaining fatigue damage or failure at the focal point, the resulting temperature rise at the focal zone is not excessive.

An idea of the overall temperature rise that may be encountered can be gained from the following:

Assuming that the power supplied to the wave guide 11 and the duration and frequency of the power pulses are as given above by way of example, and further assuming that the specimen absorbs all of the ultrasonic energy, is made of steel and has a mass of 400 grams, then the thermal energy applied to the specimen is $816 \times 0.01 = 8.16$ joules per pulse (which is 1.95 calories per pulse). The heat capacity of the specimen is $400 \times 0.114 = 46$ cal./° C. Hence, if the temperature rise were uniform throughout the specimen, the temperature rise per pulse would be $1.95/400 = 0.0049°$ C. If the apparatus 10 is operated intermittently for one minute, that is, for 60 power pulses producing a total of 6 million stress cycles, the average temperature rise (without heat losses through cooling) would be $60 \times 0.0049 = 0.29°$ C. which would represent virtually a cold fatigue test despite the employment of sound energy at ultrasonic frequencies. Even if it is assumed that the temperature rise at the focal zone P is 10 times that indicated above as the average for the test piece, this would result in a 2.9° C. temperature rise per minute at the focal zone. Such a moderate temperature rise at the focal zone will not seriously affect the results of the fatigue test and, it should be understood, is calculated without consideration of the dissipation of heat from the test piece to the ambient atmosphere during the test.

Referring now to FIG. 2, it will be seen that the sound intensity I transmitted through wave guide 11 to specimen S is there plotted as a function of time $t$. The power pulses indicated at $P_1$–$P_6$ each have a duration of $t_p$ and are separated by intervals of the duration $t_1$, so that each operating cycle of the apparatus requires the time $t_c$. Where the frequency in each power pulse is 10 mc./s., a desirable ratio of $t_p/t_c$ is 0.01. Thus, as in the previously given example, if $t_p$ is 0.01 sec., then $t_c$ is 1.0 sec.

Many methods are available for the detection of fatigue damage or textural changes occurring at focal zone P within the specimen as a result of a succession of power pulses introduced therein with the focusing wave guide 11. Since the apparatus 10 includes an arrangement of transducer elements 12 having a focus at the zone P where fatigue damage will be made to occur, it is practically advantageous to use such transducer elements in a damage detection system which operates on the pulse-echo principle. As shown on FIG. 1, the damage detection system may comprise a conventional generator 26 triggered by the triggering circuits 25 to emit probing pulses $p_1$–$p_6$ in the intervals between successive power pulses $P_1$–$P_6$, respectively, as indicated on FIG. 2. Such probing pulses $p_1$–$p_6$ are of relatively low intensity, as shown, and are fed to transducer elements 12 to cause the latter to generate relatively low intensity pulses of sound energy transmitted through wave guide 11 and focused thereby at the focal zone P. Also provided are a conventional receiver 27 actuated by triggering circuits 25 so as to receive from transducer elements 12 the echoes of the probing pulses and an oscilloscope 28 for visually indicating such echoes.

As shown on FIG. 3, with regard to the probing pulses $p_1$–$p_3$, so long as there is no fatigue damage or textural change at the focal zone P by reason of the preceding power pulses, each probing pulse will result in an oscilloscope indication representing the reflection of the probing pulse at the interface between wave guide 11 and specimen S, as at $a_1$, $a_2$ and $a_3$, and also a later oscilloscope indication representing the echo or reflection from the surface of the specimen which is remote from surface $S_1$, as at $b_1$, $b_2$ and $b_3$. However, when the onset of fatigue produces inhomogeneity at the focal zone P, the subsequent probing pulses will also be reflected more or less at such zone to provide corresponding visual indications on the oscilloscope, as at $c_4$, $c_5$ and $c_6$. As repeated power pulses are applied, the fatigue damage becomes heavier, and consequently the echo intensity increases with successive probing pulses, as is apparent at $c_4$, $c_5$ and $c_6$. Assuming that each power pulse involves 100,000 stress cycles, it will be apparent that, in the example illustrated by FIG. 3, the onset of fatigue damage only appears after a total of 400,000 stress cycles, that is, in connection with probing pulse $p_4$ following the fourth power pulse $P_4$.

Accordingly, it will be apparent that, in accordance with this invention, cyclic stressing sufficient to initiate fatigue damage within the specimen can be effected in a short period of time without undue heating of the specimen, and it is possible to determine the number of stress cycles required to initiate the fatigue damage and to evaluate the increasing damage arising by reason of the continuing cyclic stressing of the specimen by the periodically applied power pulses.

In the apparatus 10 described above with reference to FIG. 1, a compressed liquid film 15 is employed for coupling the focusing wave guide 11 to the specimen S. However, a liquid coupling film cannot transmit shear waves and therefor considerable energy is lost by shear wave absorption. This problem can be avoided either by providing a solid coupling layer bonding the wave guide to the specimen or by directly bonding the wave guide to the specimen.

The solid coupling layer bonding the wave guide to the specimen may be constituted by a pellet or thin disk of a low melting point metal, such as, Wood's metal or soft solder, or of a thermoplastic resin interposed between end surface 14 of the wave guide and surface $S_1$ of the specimen. The application of heat, for example, as by an induction coil, melts the pellet or disk which is then allowed to cool and hence solidify in bonding relation to the wave guide and specimen. The heat for melting the thin disk or pellet may also be generated by friction, for example, by spinning the wave guide 11 while it is pressed against the specimen with the disk or pellet interposed therebetween, or by vibrating the wave guide parallel to the surface $S_1$, as in conventional ultrasonic welding. Further, if the material of the pellet is electrically conductive, melting of the pellet can be achieved by passing an electric current therethrough, as in resistance soldering. Bonding of the wave guide to the specimen in the manner here described is advantageous in that, following the fatigue testing of the specimen, the bond can be easily undone, either by reheating of the material of the bonding pellet so as to again melt the same, or by the forcible breaking of the bond.

The direct bonding of the focusing wave guide to the specimen can be effected by conventional friction welding, ultrasonic welding, resistance welding or diffusion welding techniques. Such direct bonding has the disadvantage of strongly resisting the breaking of the bond at the conclusion of the fatigue test.

It is also to be noted that the bonding of the focusing wave guide to the specimen may be effected through the use of thermosetting plastic resins or chemical bonding agents. It is further possible to use glass as the bonding substance in connection with rapid induction heating, for example, as disclosed in "Product Engineering," Apr. 26, 1965, pages 62–65. Another good coupling substance is indium which is soft and adheres well to all metals.

Figure 5:
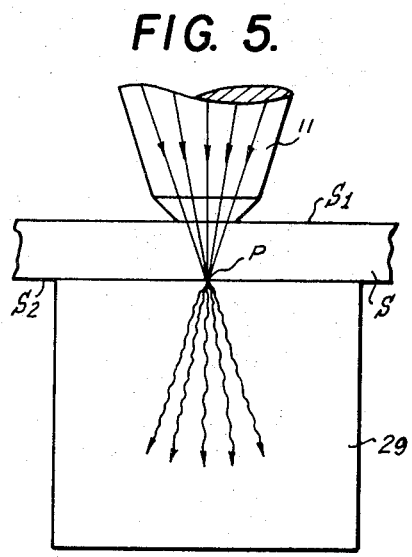
FIG. 5 is a fragmentary schematic view illustrating the use of this invention for testing a specimen for fatigue damage adjacent a surface thereof.

Although it is an advantage of fatigue testing according to this invention that the fatigue damage can be made to occur within the specimen at a distance from any surface thereof so as to be independent of the surface characteristics of the specimen, such testing can also be conducted with respect to the resistance to fatigue damage close to a surface of the specimen. Thus, as shown particularly on FIG. 5, the wave guide 11 may be bonded to the surface $S_1$ of specimen S to provide a focal point or zone P for the introduced sound energy close to the opposed surface $S_2$. In order to avoid problems caused by wave reflection at the surface $S_2$, a sound absorbing block 29 is preferably engaged with surface $S_2$. The block 29 is formed of a material having good sound conducting properties, particularly with respect to high frequencies. Many cast metals, such as, coarse-grain copper-bronze, are suitable for this purpose as the coarse grains thereof are excellent scatterers and diffusers for high frequency sound waves. As in the previously described embodiment, the wave guide 11 is bonded to surface $S_1$, and similar bonding of block 29 to surface $S_2$ is also effected. Following such bonding to specimen S, the fatigue test is conducted in the previously described manner.

Figure 6:
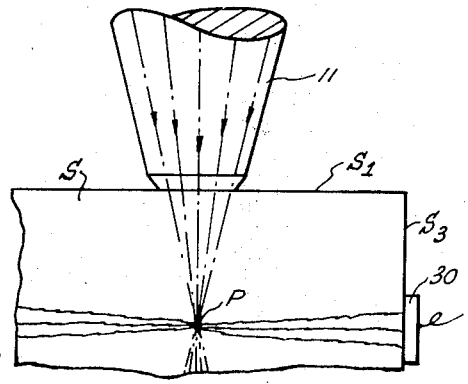
FIG. 6 is a schematic view of an arrangement for detecting fatigue damage or failure according to another embodiment of this invention.

Although the apparatus 10 of FIG. 1 uses the transducer elements 12 to both transmit probing pulses and receive echoes thereof when detecting fatigue damage by the pulse-echo principle during the intervals between power pulses, other arrangements may be provided for damage detection. For example, as shown on FIG. 6, the transducer elements associated with focusing wave guide 11 may be used only for introducing the power pulses and probing pulses into specimen S, and one or more additional pick-up transducers 30 may be attached to a lateral surface $S_3$ of the specimen to pick up the sound waves which are refracted, scattered or diffracted from the focal zone P when fatigue damage or textural change occurs at such zone by reason of the previously applied power pulses.

Figure 7:
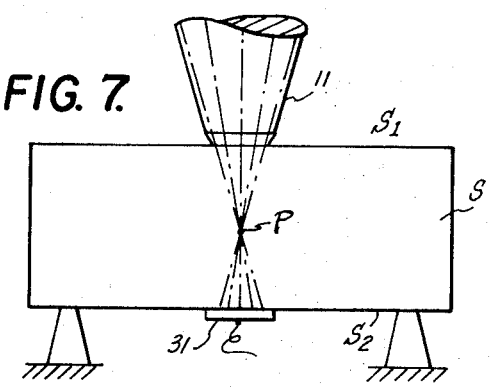
FIG. 7 is a schematic view similar to that of FIG. 6, but illustrating still another arrangement for detecting the fatigue damage or failure.

Another arrangement for detecting fatigue damage is illustrated in FIG. 7, where the transducer elements associated with focusing wave guide 11 are again used only to introduce the power pulses and the probing pulses into specimen S. In this arrangement, a separate pick-up transducer 31 is attached to the surface $S_2$ of the specimen opposed to the surface $S_1$ at which the probing pulses are introduced through wave guide 11. Such pick-up transducer 31 may be used to monitor the phase relation between the sound waves introduced through wave guide 11 to specimen S during each probing pulse and the sound waves transmitted through focal zone P to transducer 31. The occurrence of fatigue damage in the zone P causes a sudden variation in such phase relation.

With the arrangement of FIG. 7, the pick-up transducer 31 can alternatively be employed to monitor the intensity of the sound transmitted thereto through focal zone P during the probing pulses. In this case, a reduction in signal intensity from pick-up transducer 31 indicates an increase in absorption at zone P due to fatigue damage or textural change at such zone.

In all of the foregoing arrangements for detecting fatigue damage or textural change at the focal zone P, use has been made of relatively low intensity probing pulses generated during the intervals between power pulses and similarly focused at the zone P. However, long before serious fatigue damage occurs, the micropore or slip-line formation that heralds the onset of fatigue damage produces characteristic sonic or ultrasonic emissions (see: "Acoustic-Emission Strain Waves," JASA, vol. 41, No. 2, February 1967, pages 321–327). Such emissions arising from the cyclic stressing at zone P by the power pulses there focused may be readily detected either by the transducer elements 12 at the large end of wave guide 11 or by an additional pick-up transducer 32 attached to specimen S, as shown on FIG. 8, or to a side wall surface of the wave guide. Since the power pulses for inducing fatigue damage are in the megacycle range and the described emissions have frequencies in the range from about 3 kc. to 30 kc., it is a simple matter to filter the emissions from the power pulses and hence to detect the emissions simultaneously with the power pulses even when the transducer elements 12 are used for such detection.

Figure 8:
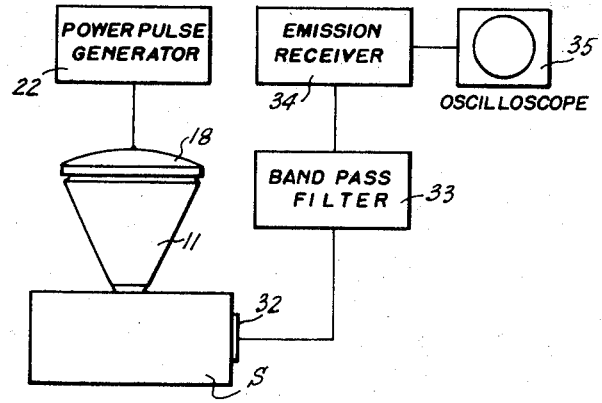
FIG. 8 is a schematic view illustrating a further arrangement for detecting fatigue damage or failure simultaneously with the power pulses for stressing the specimen.

In the arrangement of FIG. 8 employing the separate pick-up transducer 32 for detecting the emissions, the output of transducer 32 is fed through a band pass filter 33 to an emission receiver 34 and thence to an oscilloscope 35 to visually indicate the occurrence of emissions in the frequency range passed by filter 33.

When fatigue damage has reached a certain level, that is, at least after the formation of micro-cracks, characteristic noises of lower frequency, not to be confused with the above mentioned emissions caused by micropores and slip-line formation, are generated by the friction between sliding crack boundaries. These noises of lower frequency can also be detected, for example, by an arrangement similar to that depicted on FIG. 8, as indications of fatigue damage occurring at the focal zone within specimen S.

In the previously given numerical example of fatigue testing according to the invention, the frequency of the power pulses has been stated to be 10 mc./s., but considerable variation is permissible in this frequency, preferably in the range between about 5 mc./s. and 20 mc./s. As the frequency is decreased, the sharpness of focus of the sound energy within the specimen is also decreased unless the dimensions of the wave guide 11 are suitably increased to maintain the desired focus. Such decrease in focus tends to reduce the intensity of the cyclic stressing of the specimen at the focal zone. On the other hand, if the frequency of the power pulses is unduly increased, this leads to increased complexity of the equipment and also to increased absorption of the energy, and hence energy losses, particularly at the interface of the wave guide with the specimen.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of fatigue testing a specimen which comprises generating substantially constant intensity power pulses of ultrasonic energy exteriorly of said specimen at a frequency in the range from approximately 5 mc./sec. to 20 mc./sec., transmitting said energy into said specimen through a surface thereof while focusing the energy to a focal point within said specimen at a substantial distance from said surface thereby to effect high intensity cyclic stressing of the specimen in the region of said focal point at said pulse frequency, and sonically detecting the appearance of inhomogeneity at said region as a result of fatigue due to said cyclic stressing.

2. The method according to claim 1, in which said power pulses are of relatively short duration in relation to the intervals therebetween so as to minimize temperature rises in said specimen.

3. The method according to claim 2, in which each of said intervals is approximately one hundred times as long as said duration of each power pulse.

4. The method according to claim 1, in which said power pulses of ultrasonic frequency are generated in transducer elements on a solid wave guide which is coupled to said specimen at said surface and configured to effect said focusing of the wave energy transmitted through said wave guide.

5. The method according to claim 4, in which said wave guide is coupled to said specimen through a liquid film of high viscosity and low compressibility, and said film is pressurized to suppress cavitation therein.

6. The method according to claim 4, in which said wave guide is coupled to said specimen through a solid bonding film therebetween so as to minimize shear wave absorption at the interface between said wave guide and specimen.

7. The method according to claim 4, in which said wave guide is directly bonded to said specimen.

8. The method according to claim 1, in which the sonic detection of the appearance of inhomogeneity at said region is effected by focusing relatively lower intensity probing pulses at said focal point in the intervals between said power pulses, and monitoring the effect on said probing pulses of the textural quality of said specimen at said region thereof.

9. The method according to claim 8, in which said monitoring consists in detecting the presence of any echo of said probing pulses from said region as an indication of fatigue damage therein.

10. The method according to claim 8, in which said monitoring consists in detecting scattering of said probing pulses from said region as an indication of the occurrence of fatigue damage therein.

11. The method according to claim 8, in which said monitoring consists in detecting shifting of the phase relation between said probing pulses as introduced to said specimen and as transmitted through said specimen by way of said region of the focal zone.

12. The method according to claim 8, in which said monitoring consists in detecting absorption of said probing pulses at said region as an indication of the occurrence of fatigue damage therein.

13. The method according to claim 1, in which the sonic detection of the appearance of inhomogeneity at said region is effected by monitoring the relatively low frequency emissions and noises emanating from said region upon the formation of micro-pores, slip-lines and micro-cracks therein.

14. The method according to claim 1, in which said focal point is adjacent a second surface of said specimen opposed to the first mentioned surface, and a sound-absorbing block is bonded to said second surface to substantially avoid reflections of sound waves at said second surface.

15. Apparatus for the ultrasonic fatigue testing of a specimen comprising a solid, generally frusto-conical wave guide having a convex large end surface and a small end surface adapted to be coupled to a surface of the specimen, transducer means on said large end surface electrically energizable to produce elastic waves transmitted through said wave guide into the specimen coupled thereto and being focused at a focal point beyond said small end surface and hence within the specimen, generator means to feed electrical power pulses of substantially constant intensity and a frequency in the range from approximately 5 mc./sec. to 20 mc./sec. to said transducer means with the intervals between said power pulses being long in relation to the duration of the pulses, whereby to effect high intensity cyclic stressing of the specimen at said pulse frequency in the region of said focal point while minimizing the temperature rise of the specimen by reason of such stressing, and sonic detection means to detect the appearance of inhomogeneity at said region of the focal point as a result of fatigue due to said high intensity cyclic stressing.

16. Apparatus according to claim 15, in which said sonic detection means includes means operated during said intervals to energize said transducer means with relatively lower intensity probing pulses, and means monitoring the effect on said probing pulses of the textural quality of the specimen at said region of the focal point.

17. Apparatus according to claim 16, in which said monitoring means includes means to receive and display signals from said transducer means representing echoing of said probing pulses from said region of the focal point.

18. Apparatus according to claim 16, in which said monitoring means includes pick-up transducer means energizable by the scattering of said probing pulses from said region of the focal point, and means to receive and display signals from said pick-up transducer means as indications of the occurrence of fatigue damage in said region.

19. Apparatus according to claim 16, in which said monitoring means includes pick-up transducer means coupled to a surface of the specimen opposed to the specimen surface to which said wave guide is coupled so as to be energizable by said probing pulses after transmission through said region of the focal point, and means to receive and display signals from said pick-up transducer means for indicating phase-shifting or absorption of the power pulses at said region by reason of fatigue damage therein.

20. Apparatus according to claim 15, in which said sonic detection means includes pick-up transducer means coupled to the specimen, filter means connected to said pick-up transducer means to pass only those signals therefrom in a relatively low frequency range characteristic of the emissions or noises emanating from said region upon the formation of micro-pores, slip-lines or micro-cracks therein, and means to display said signals passed by said filter means.

References Cited

UNITED STATES PATENTS

| | | | |
|---|---|---|---|
| 2,932,189 | 4/1960 | Carlin | 73—67.7 |
| 3,402,598 | 9/1968 | Colgate | 73—67.8 |

OTHER REFERENCES

An article by W. P. Mason entitled, "Internal Friction and Fatigue in Metals at Large Strain Amplitudes," from "The Journal of the Acoustical Society of America," vol. 28, No. 6, November 1956.

JAMES J. GILL, Primary Examiner

U.S. Cl. X.R.

73—67.7